United States Patent
Kerr (10) Patent No.: US 10,080,961 B2
(45) Date of Patent: Sep. 25, 2018

(54) UNIFORM GAME DISPLAY ACROSS MULTIPLE DEVICES

(71) Applicant: John T Kerr, San Mateo, CA (US)

(72) Inventor: John T Kerr, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 273 days.

(21) Appl. No.: 15/199,031

(22) Filed: Jun. 30, 2016

(65) Prior Publication Data

US 2018/0001190 A1 Jan. 4, 2018

(51) Int. Cl.
*A63F 13/26* (2014.01)
*A63F 13/33* (2014.01)
*A63F 13/335* (2014.01)
*A63F 13/35* (2014.01)
*A63F 13/79* (2014.01)
*A63F 13/52* (2014.01)
*A63F 13/332* (2014.01)
*A63F 13/327* (2014.01)

(52) U.S. Cl.
CPC .............. *A63F 13/26* (2014.09); *A63F 13/33* (2014.09); *A63F 13/335* (2014.09); *A63F 13/35* (2014.09); *A63F 13/52* (2014.09); *A63F 13/79* (2014.09); *A63F 13/327* (2014.09); *A63F 13/332* (2014.09); *A63F 2300/405* (2013.01); *A63F 2300/406* (2013.01); *A63F 2300/407* (2013.01); *A63F 2300/8082* (2013.01)

(58) Field of Classification Search
CPC ........ A63F 13/26; A63F 13/327; A63F 13/33; A63F 13/332; A63F 13/335; A63F 13/35; A63F 13/52; A63F 13/79; A63F 2300/405; A63F 2300/406; A63F 2300/407; A63F 2300/8082
See application file for complete search history.

(56) References Cited

U.S. PATENT DOCUMENTS

| | | | |
|---|---|---|---|
| 7,293,235 B1* | 11/2007 | Powers | G06T 7/20 463/1 |
| 8,823,701 B2* | 9/2014 | Aldridge | A63F 13/358 345/419 |
| 9,192,863 B2* | 11/2015 | Ladell | G06T 11/40 |
| 9,358,460 B2* | 6/2016 | Ahiska | G06F 9/44568 |
| 9,375,636 B1* | 6/2016 | Wakeford | A63F 13/00 |
| 9,569,812 B1* | 2/2017 | Kopf | G06T 1/20 |
| 9,694,276 B2* | 7/2017 | Stine | A63F 13/35 |
| 9,889,374 B2* | 2/2018 | Rom | A63F 13/212 |
| 9,889,380 B1* | 2/2018 | Wakeford | A63F 13/67 |

(Continued)

*Primary Examiner* — William H McCulloch, Jr.
(74) *Attorney, Agent, or Firm* — Donald R. Boys; Central Coast Patent Agency, LLC (57) ABSTRACT

A system serves a multi-player virtual-reality (VR) game to two appliances used by players. The server receives data from the first computerized appliance indicating new activity of a controllable object controlled by the first player, determines instant state of the controlled object, accesses predictive display data, selects, according to the instant state of the controlled object, specific predictive display data associated with the first player, and sends the specific predictive display data to the second computerized appliance, where it is utilized to display a predicted movement over time of the first controlled object in the second display.

16 Claims, 6 Drawing Sheets

(56) References Cited

U.S. PATENT DOCUMENTS

| | | | |
|---|---|---|---|
| 2003/0177187 A1* | 9/2003 | Levine | A63F 13/10 |
| | | | 709/205 |
| 2003/0225560 A1* | 12/2003 | Garcia | G06F 17/5022 |
| | | | 703/17 |
| 2006/0154713 A1* | 7/2006 | Sunazuka | A63F 13/12 |
| | | | 463/6 |
| 2006/0200253 A1* | 9/2006 | Hoffberg | G05B 15/02 |
| | | | 700/19 |
| 2008/0115121 A1* | 5/2008 | Douceur | A63F 13/12 |
| | | | 717/168 |
| 2012/0178529 A1* | 7/2012 | Collard | G06F 3/011 |
| | | | 463/31 |
| 2012/0278439 A1* | 11/2012 | Ahiska | G06F 9/44568 |
| | | | 709/218 |
| 2013/0120364 A1* | 5/2013 | Aldridge | G06T 15/00 |
| | | | 345/419 |
| 2013/0137518 A1* | 5/2013 | Lucas | A63F 13/12 |
| | | | 463/42 |
| 2015/0119139 A1* | 4/2015 | Ladell | G06T 11/40 |
| | | | 463/31 |
| 2015/0310665 A1* | 10/2015 | Michail | G06T 19/006 |
| | | | 345/419 |
| 2016/0256784 A1* | 9/2016 | Schultz | A63F 13/79 |
| 2018/0001190 A1* | 1/2018 | Kerr | A63F 13/26 |
| 2018/0027230 A1* | 1/2018 | Kerr | H04N 13/0484 |
| | | | 345/156 |

* cited by examiner

UNIFORM GAME DISPLAY ACROSS MULTIPLE DEVICES

BACKGROUND OF THE INVENTION

1. Field of the Invention

The present invention is in the technical area of client-server technology in virtual reality games, and pertains more particularly to normalizing user experience in multi-player games.

2. Description of Related Art

A typical architecture in multi-player, virtual reality games, involves a plurality of players, each employing a separate gaming device having display capability, with each device coupled to a network wherein a server or servers in the network receive manipulation data from input apparatus of the player's devices, defining movement of an avatar (for example) desired by individual players, and wherein the server through execution of software interprets the input data, performs in many circumstances physical simulations, updates avatar and object movement in the game involving the plurality of players, and streams display data back to each of the player's devices, to show ongoing activity in the game, all of which is interactively followed by the players to make new desired movement of avatars and other controlled objects in the game.

A problem known to persist in such a multi-player game is that there is a time delay from, for example, the time one player operates an input to control an avatar or other controlled object, and the receipt of new positional information by all of the players in the game as a result of the first player's input. If the avatar or controlled object is, for example, moving in the display, this time delay can cause anomalies in the display of the various devices used by the multiplicity of players, and ongoing adjustments have to be made to reposition the avatar or object in the various displays. In some cases, even though the adjustments may be made in smooth transition, the display effect may be unnatural.

What is clearly needed is apparatus and methods to eliminate, as much as possible, such display anomalies described above in the display of avatars and other controlled objects in the displays of the multiplicity of devices used by the plurality of players.

BRIEF SUMMARY OF THE INVENTION

A system is provided, comprising a network-connected, computerized server executing software from a non-transitory medium, coupled to a data repository, serving a multi-player virtual-reality (VR) video game based on a virtual world, the VR video game stored in the data repository, a first computerized appliance having a first display, connected to the network, used by a first player to manipulate a first controllable object in the multi-player VR game, a second computerized appliance having a second display, connected to the network, used by a second player to manipulate a second controllable object in the multi-player VR game, and first predictive display data associated uniquely with the first player, the first controllable object controlled by the first player, and states of the object, states including at least location in the virtual world and proximity to other objects in the virtual world, the first predictive display data stored in the data repository. The network-connected computerized server, executing the software, receives first data from the first computerized appliance indicating new activity of the first controllable object controlled by the first player, determines instant state of the controlled object, accesses the first predictive display data, selects, according to the instant state of the controlled object, specific predictive display data associated with the first player, and sends the specific predictive display data to the second computerized appliance, where it is utilized to display a predicted movement over time of the first controlled object in the second display.

In one embodiment the predictive display data provides display of movement over time of the controlled object, from the instant state of the object at the time the movement commenced, to a new state predicted for an end of the movement. Also in one embodiment the system further comprises a multiplicity of players and a multiplicity of VR games, wherein each player is accorded a profile, and each player is tracked regarding activity and state of controlled objects, the system building predictive display data in profiles for each player in the multiplicity of players. Also in one embodiment the activity and states of controlled objects associated with specific players is analyzed to categorize common and repetitive activity. Also in one embodiment the tracking, recording, analysis and predictive data creation is accomplished in a continuing basis as an artificial intelligence (AI) operation for determining and updating predictive data for display of controlled objects.

In one embodiment of the invention predictive display data is stored and utilized at individual ones of computerized appliances used by players to connect to the network-connected server to play games. Also in one embodiment predictive display data is stored for demographically-related groups of players, and is accessed and used for predictive display for activities by new players for which the system has no significant history. And in one embodiment, for activity of a controlled object by a player, the system first seeks predictive display data associated specifically with the player, failing to find such data, seeks data stored for a demographic category fitting the player, and failing to find such data, reverts to conventional techniques for sending display data.

In another aspect of the invention a method is provided, comprising generating, by a network-connected, computerized server executing software from a non-transitory medium, coupled to a data repository, serving a multi-player virtual-reality (VR) video game based on a virtual world, the VR video game stored in the data repository, first predictive display data associated uniquely with the first player, the first controllable object controlled by the first player, and states of the object, states including at least location in the virtual world and proximity to other objects in the virtual world, the first predictive display data stored in the data repository, receiving, from a first computerized appliance having a first display, connected to the network, used by the first player to manipulate a first controllable object in the multi-player VR game, first data from the first computerized appliance indicating new activity of the first controllable object controlled by the first player, determining instant state of the controlled object, accessing the first predictive display data, and selecting, according to the instant state of the controlled object, the specific predictive display data associated uniquely with the first player, and sending the specific predictive display data to the second computerized appliance, where it is utilized to display a predicted movement over time of the first controlled object in the second display.

In one embodiment of the predictive display data provides display of movement over time of the controlled object, from the instant state of the object at the time the movement commenced, to a new state predicted for an end of the movement. Also in one embodiment the method further comprises a multiplicity of players and a multiplicity of VR games, wherein each player is accorded a profile, and each player is tracked regarding activity and state of controlled objects, the system building predictive display data in profiles for each player in the multiplicity of players. In one embodiment the activity and states of controlled objects associated with specific players is analyzed to categorize common and repetitive activity. Also in one embodiment the tracking, recording, analysis and predictive data creation is accomplished in a continuing basis as an artificial intelligence (AI) operation for determining and updating predictive data for display of controlled objects.

In one embodiment predictive display data is stored and utilized at individual ones of computerized appliances used by players to connect to the network-connected server to play games. Also in one embodiment predictive display data is stored for demographically-related groups of players, and is accessed and used for predictive display for activities by new players for which the system has no significant history. And in one embodiment, for activity of a controlled object by a player, the system first seeks predictive display data associated specifically with the player, failing to find such data, seeks data stored for a demographic category fitting the player, and failing to find such data, reverts to conventional techniques for sending display data.

DETAILED DESCRIPTION OF THE INVENTION

Figure 1:
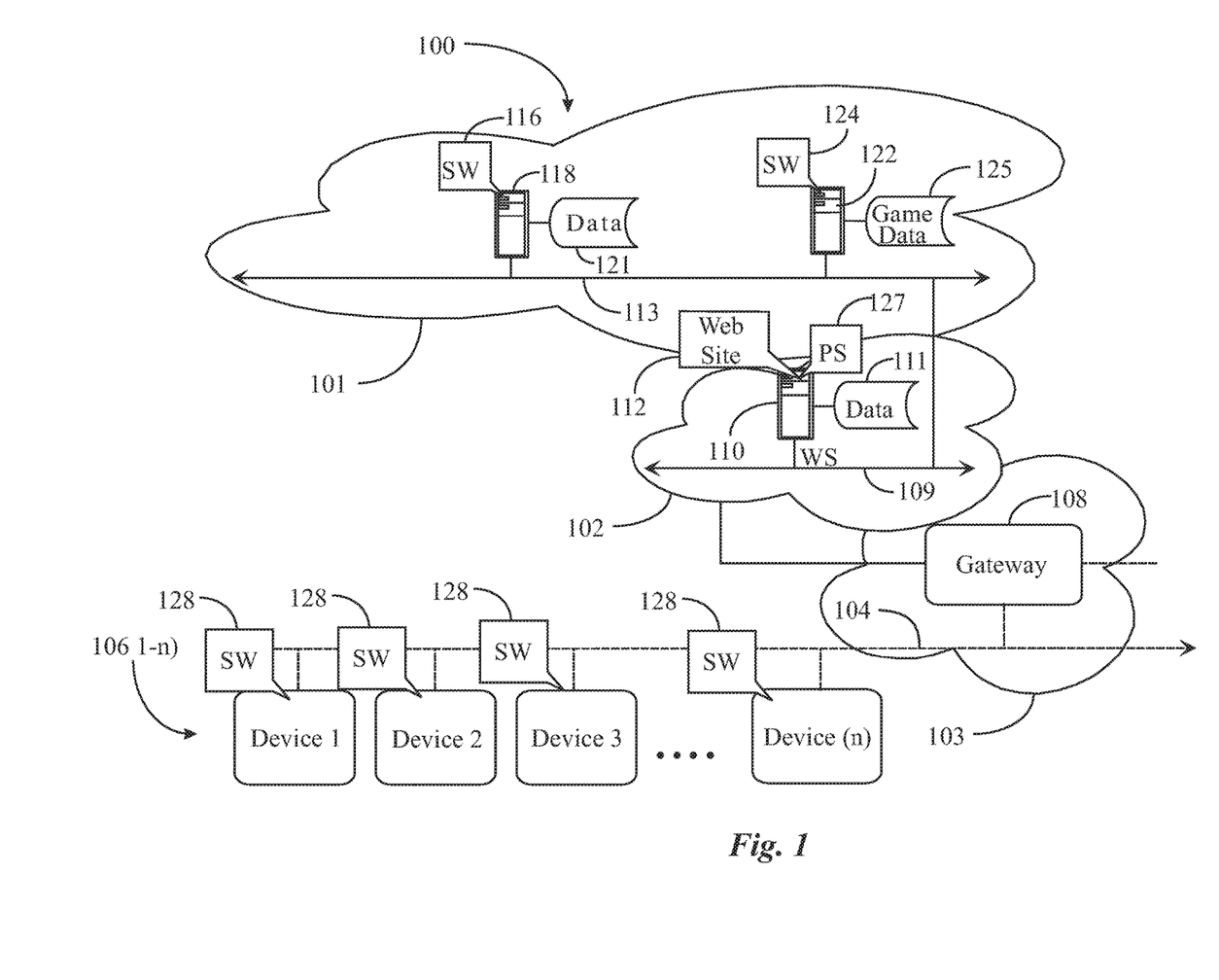
FIG. 1 is an architecture diagram according to an embodiment of the present invention.

FIG. 1 is an architectural diagram of a communications network 100 supporting a dynamic Virtual Reality (VR) game service according to an embodiment of the present invention. Network 100 includes a wide area network (WAN) 102. WAN 102 may be a private or public WAN without departing from the spirit and scope of the invention, but will be considered in this specification as the well-known Internet network Internet 102 is characterized by an Internet backbone 109 which represents all of the lines, equipment, and access points that make up the Internet as a whole, including connected sub-networks. Therefore, there are no geographic limitations to the practice of the invention.

Internet backbone 109 supports a Web server 110, which includes a processor and at least one data repository coupled thereto and a memory storing all of the data and code to enable function as a Web server. Web server 110 hosts a gaming Website 112 that represents a gaming access portal for registered users and visitors of host gaming service to access games to play, among other functionality. Users operating gaming devices, each having input mechanisms and a display, such as devices 106 (1-n), may access server 110 and Website 112 through a communications carrier network 103. It will be apparent to the skilled person that the gaming devices may be at any site, anywhere, having Internet access, and that there are many known ways that such devices may access the Internet and connect to server 110.

Web server 110 in this example has connection to a data repository 111 storing player data of many types and forms. Player data may include any data about players and player accounts, and may in some implementations include behavioral data regarding player preferences and typical player performance in a variety of circumstances, and results of artificial intelligence manipulations of player data. In one example, players using devices 106 (1-n) may register through WS 112 to gain gaming privileges. WS 112 may include in one embodiment a proxy service 127 for optimizing game presentation according to categories and ratings, like most popular games, user-rated games, games having the most active players, top revenue producing games, top points producing games and so on.

Network 103 may be a cellular communications network of third or fourth generation (3G, 4G). Network 103 also may be a wireless network like a wireless fidelity (WiFi) network without departing from the spirit and scope of the invention. In this embodiment, network 103 is a wireless access network accessible to devices 106 (1-n) via wireless backbone 104. Backbone 104 simply illustrates wireless connectivity between players 106 (1-n) and a network gateway 108 within carrier network 103. Gateway 108 represents any gateway supporting full multimedia data transmission between the carrier network and the Internet network. Gateway 108 may be part of an Internet service provider (ISP) entity providing access to Internet services for network 103. The skilled person will recognize that wireless access as shown in FIG. 1 is but one of many ways that devices 106(1-n) may access the Internet network.

Devices 106 (1-n) in this example gain access to Internet 102, more particularly Website 112 hosted on Web server 110, through access network 103. Devices 106 (1-n) may utilize a variety of different appliances for gaming, including but not necessarily limited to a laptop computer, a notebook computer, a tablet computer, a cellular telephone, an android device, a Pad device, a dedicated gaming device or computer, or any other computing appliance or system capable of engaging with the game service and displaying the results of play visually on the device.

In one embodiment a gaming device operated by a player may include a client-side software application 128. Application 128 may enable automatic receipt and execution on the appliance of a game served thereto with complete scripting and instruction for automatic play, and may also in some embodiments accomplish other functions, such as physical simulation.

A game service-provider domain is represented in this example by a gaming provider sub network 101. Sub network 101 may be a local area network (LAN), a campus area network (CAN), or some other connected sub network without departing from the spirit and scope of the present invention. Network 101 is further characterized by a network backbone 113 having connection to Internet backbone 109. Backbone 113 may be referred to hereinafter in this specification as LAN 113. LAN 113 may support various components relative to providing a gaming service accessible through the Internet network.

In this example, LAN 113 supports a game server 122 that includes a processor and a data repository, the processor coupled to memory storing all of the software and instruction enabling functionality as a game server. Game server 122 has connection to a data repository 125 storing game data. Game data may include images, files, scripts, and other data components required to support gaming services. In actual practice there may be separate servers for serving file data, image data, etc. for games in play on the server. Repository 125 represents data from all of these servers. Game server 122 in this example executes software (SW) 124, which SW provides for operation of the server, serving of games to players, receipt of input data from remote devices operated by players, such as Device 1 and Device 2, which data includes desired movement of avatars and controlled objects, processing of incoming data, and transmission of display data to the remote Devices to cause display of objects in a served game, as well as a physics engine in some instances for simulating real-time physics of objects in a VR environment in active game play. SW 124 is meant to include all executable code that may be used by server 122.

LAN 113 supports a reporting data server 118 executing SW 116. Server 118 includes a processor, at least one data repository and a memory storing all of the software and instruction for enabling function as a reporting data server capable of managing and reporting data about player gaming behavior, including raw data and refined or processed data, and for providing such data to server 122. Server 118 has connection to a data repository 121. Data repository 121 stores data relative to behavior of players in playing games, and may also store data concerning player commonalities, such as age and gender, and propensities of player behavior over such commonalities.

Figure 2:
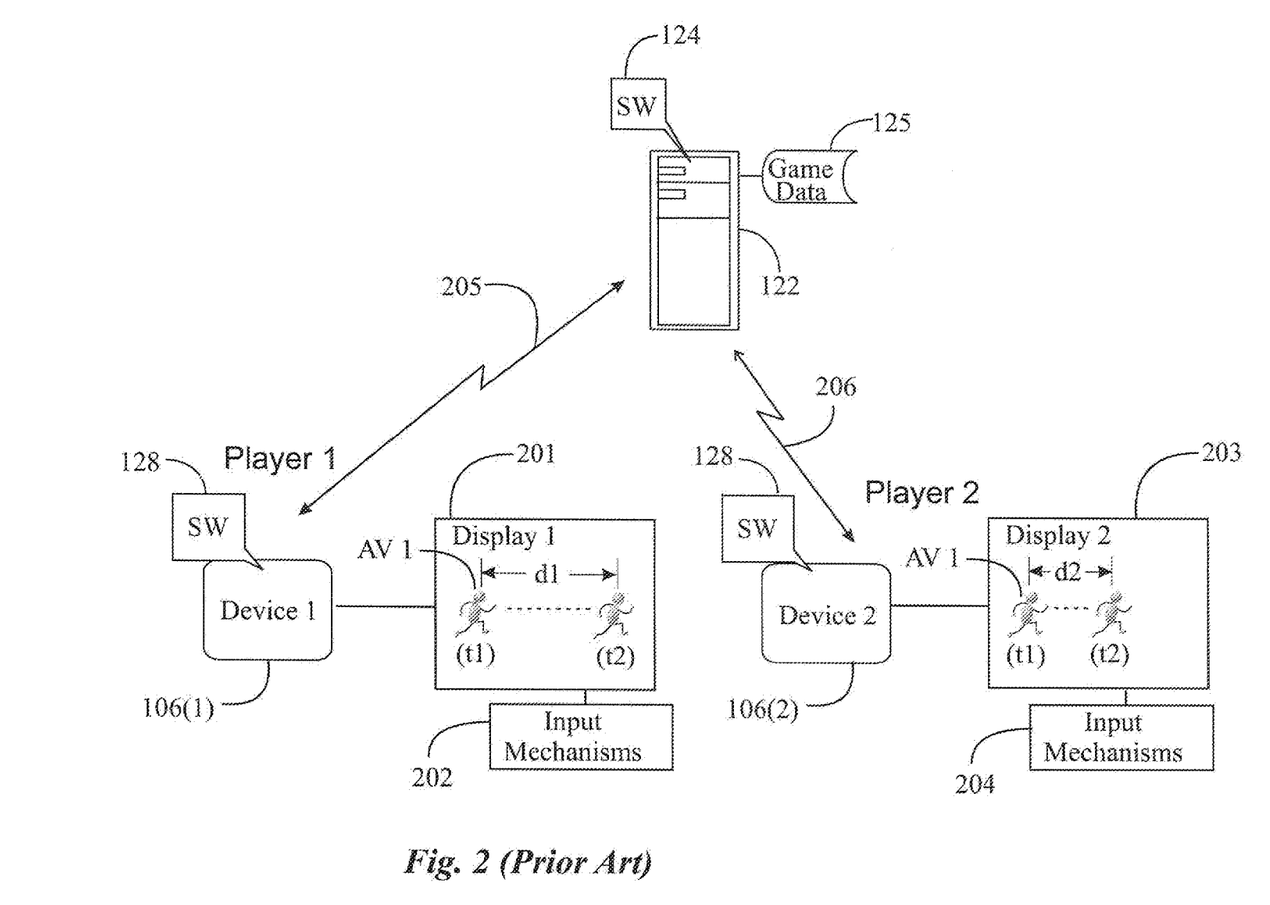
FIG. 2 is a diagram illustrating Server management of a Virtual Reality game between two of a multiplicity of potential devices used by players, as practiced in conventional art.

FIG. 2 is an architecture diagram simplified from FIG. 1, illustrating Device 1 and Device 2 of the plurality devices 106(1-*n*) of FIG. 1, each of the devices executing client-side SW 128 as also shown in FIG. 1, and Game Server 122 from FIG. 1, executing SW 124 and connected to Game Data repository 125.

Device 1, which is 106(1) from FIG. 1, has a coupled display 201, labeled display 1, and input mechanisms 202 by which a user of Device 1 may input commands and motion input for avatars and controlled objects that the user may follow in Display 1 while engaging in a virtual reality game. Device 2, which is 106(2) from FIG. 1, has a coupled display 203, labeled display 2, and input mechanisms 204 by which a user of Device 1 may input commands and motion input for avatars and controlled objects that the user may follow in Display 2 while engaging in a virtual reality game.

Double-ended arrows 205 and 206 indicate two-way communication between devices 1 and 2 and game server 122, by which users of the devices may log into and play virtual reality games provided by game server 122.

Problems that the present invention, in different embodiments, is meant to overcome, are directly due at least in part to exchange of data between devices 1 and 2 and Game server 122. Consider that users (Player 1 and Player 2) of Devices 1 and 2 are both logged in to a same game served by Game Server 122, and that Player 1 is represented in that game by an Avatar AV 1, shown as a graphic in both Display 1 and Display 2. It will be understood that the display of avatars and objects on both displays for the same game will have many more objects than this one avatar, as well as landscape and other environmental effects, but this one avatar is sufficient to describe the issue at hand.

Now consider that player 1 engages with inputs mechanisms 202 to move her avatar AV 1 from its present position to a new position in the display. AV 1 is shown in display 1 at the original position at time 1 (t1), and at a new position at time 2 (t2). It is reasonable that the display of AV 1 in Display 1 is managed locally with very little latency. The display of AV 1 in Display 2 for Device 2 used by Player 2, however, is different. The movement data that Player 1 produces with Input Mechanisms 202 is transmitted to Game Server 122 along path 205, and there is a transmission delay. The movement data is processed in the game, with a further small delay. Then output data along path 206 updates data at Device 2, with a further delay, and the position of AV 1 in Display 2 is adjusted accordingly by SW 128 executing on Device 2.

The overall latency in this operation is widely variable under different conditions, and can be as much as ½ second or more. The position of AV 1 in Display 2, therefore, at least without some software adjustments, cannot match in real time the position shown in Display 1, and the position discrepancy will depend at least to some extent on the rapidity and continuity with which Player 1 moves the Avatar. Assume that Player 1 moves the Avatar along a straight line from (t1) to (t2) at a uniform rate in a real time of 1 second. Assuming the ½ second total delay one may expect, then, that at time (t2) AV 1 will show in Display 2 at ½ of the way along the movement path toward a final position equal to the position shown at (t2) in Display 1. This circumstance is shown as (t2) in Display 2, where d2 is ½ of d1.

The skilled person will recognize that if Player 1 moves her Avatar AV 1 as described, and the latency is as described, that if Player 1 leaves AV 1 at the (t2) position in Display 1 for a half second or so, the position of AV 1 in Display 2 will correct to the position left in Display 1. This, unfortunately, is not the way it usually works, as players are most often motivated to make quick and somewhat complicated sequences of moves.

What happens in the art, in practice, is that Player 1 and Player 2, and, of course, other Players not shown, will be manipulating their avatars and controlled objects in a more-or-less serial manner, and each device will be transmitting manipulation data to the Game Server, and the Game Server will be processing, applying one or more physics simulation engines in some cases, and transmitting data to all of the devices to update displays in the devices. In the current art there are adjustment mechanisms such that corrections for the movement of an object in one display by one player will almost never be copied in real time into other displays at other devices, but the corrections will at least be smooth, rather than snap-to movements.

Further to the above, which depicts the most simplistic and straight-forward application and time discrepancies, in the conventional art there are corrections in place to try to alleviate some of the time discrepancy. Extrapolation, for example, is used to condition display data to display 2 for manipulations entered by player 1 for AV 1. Once player 1 commences a move of her avatar, the system will note the rate at which she is moving the avatar, and will extrapolate that rate forward in time for conditioning display data transmitted to display 2. In this circumstance the server is not just waiting for new data as AV 1 is moved by player 1, but is presuming that the rate and direction of the movement will continue, and will transmit display data so conditioned, until data is received indicating that player 1 has changed the movement of AV 1. The system will then correct the display in smooth transition. In this circumstance player 2 may see AV 1 move beyond a position intended and input by player 1, and then be smoothly corrected to update data from player 1.

It should be noted as well, that although activity of Avatars for exemplary purposes may be shown to be movement of an avatar from one position to another in the topography of the virtual environment, the same description and problems accrue to activity such as shooting a weapon, throwing a stone, performing a dance in place, and virtually any activity that may be induced by a player for her avatar or other controlled object.

In addition, the problems are not limited to just corrected movements in displays. Consider that Player 1 and Player 2, as a simple example, are engaged in a competitive multi-player game, and Player 1 moves her avatar (in her own display) to a position she expects is hidden from Player 2. The presentation of her move on Display 2, to Player 2, may be that Player 1's avatar is not hidden where and at the time Player 1 intends or expects. Player 2 may see where Player 1's avatar is because of the latency effects that the present invention is intending to correct. Further, in a fast-paced multi-player adversarial game, individual players will watch moves by other players to judge intent, as a part of their own strategy to make serial moves of their own avatars. The latency effects may be devastating in such instances.

Figure 3:
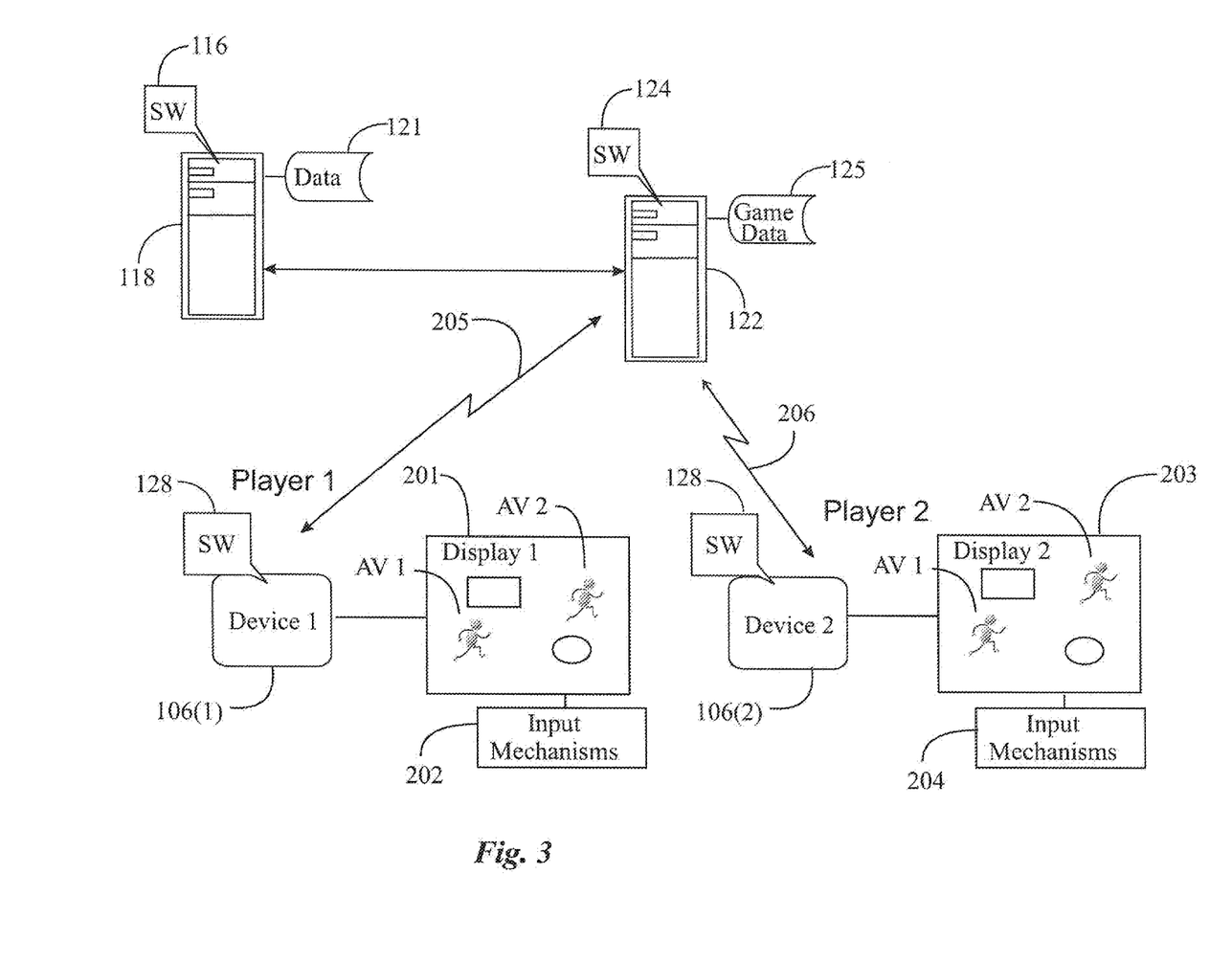
FIG. 3 is a diagram illustrating an architecture in an embodiment of the present invention.

FIG. 3 is an architecture diagram similar to FIG. 2, with addition of Data Server 118 of FIG. 1, accessible by Game Server 122 on backbone 113. In FIG. 3, AV 1, belonging to and controlled by Player 1, and AV 2, belonging to and controlled by Player 2, are shown in both Display 1 and Display 2, along with arbitrary objects that may be passive objects, or may be controlled objects. The skilled person will realize that the virtual world display will be far more detailed and comprehensive than shown in FIG. 3, but the elements included are judged to be sufficient for enabling description.

Speaking broadly about the invention with regard to FIG. 3, Data Server 118 is adapted to store in data repository 121 static and dynamic information regarding individual ones of players registered to a gaming service of the invention. Each such player will have, in embodiments of the invention, a server-accessible profile storing player identity, demographic profile, game play history, and an evolving set of conditional responses predicated on input from server 122, seeking to predict player intent and probable meaning of incoming data.

The operation between Server 122 in managing display of virtual reality games, in conjunction with server 118, is an artificial intelligence (AI) system developed to combat latency in updating object (including avatars and controlled objects) activity in displays of devices used by players in a multi-player game. Data collected for individual players and cohorts is processed by artificial intelligence and/or machine-learning algorithms to determine the best prediction of a players moves. These algorithms could be regression, neural networks, Bayesian networks, decision trees, or any number of additional algorithms well-known in the art, and available to the inventor and others with skill in the art.

Figure 4:
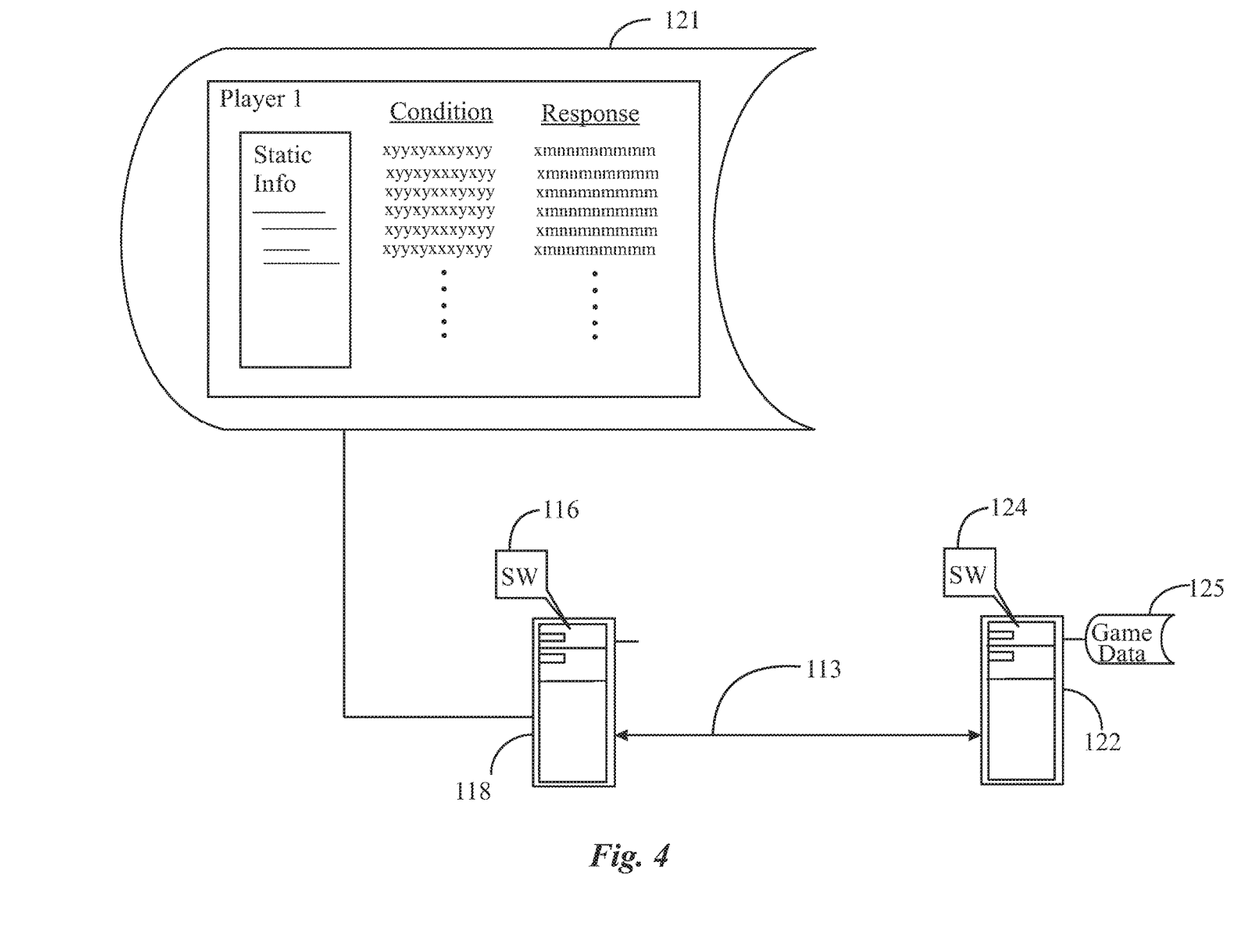
FIG. 4 is a diagram illustrating functionality in an embodiment of the present invention.

FIG. 4 is an exemplary diagram of representative data in data repository 121 maintained by Data Server 118. A profile for Player 1 is indicated, wherein Static information is stored regarding Player 1, and an evolutionary matrix of condition/response pairs is stored as an addressable rule set. It will be apparent to the skilled person that there will be a similar profile for other players as well.

In a rather sophomoric sense, as Server 122 receives input data from Device 1, indicating movement of an avatar or other controlled object in a game, Server 122, executing portions of SW 124, queries Server 118, executing SW 116. The queries identify the player, so the query is served by accessing the Condition/Response matrix for the identified player. The query also poses a condition, and in many cases more detailed data, which may include where in a game topography the player's avatar is at the time of the query, what actions may have immediately preceded this query, how long the player has been engaged in the game, and so on. A best response is found for the condition and data, and that response is returned to Server 122, which uses the responses with algorithms, to determine data feed to Device 2 and a plurality of other devices used by players who may be playing in the same game as Players 1 and 2.

A very simple example may help in understanding the operation. Suppose Player 1 has decided to move her avatar AV 1 from a position in the game at an arch in a wall between two separate fields of play, into the field of play beyond the wall. Player 1 clicks and drags, or uses whatever other input may be standard for her device, to engage AV 1 and move AV 1 for the short distance through the arch into the next field of play. Assume the production of the overall move takes Player 1 two seconds.

In embodiment of the invention it may be so that Player 1 has played the same game a number of times in the past, all play of which may have been monitored and used to build and modify the Condition/Response matrix for Player 1. There will be a condition string in the matrix for Player 1 associated at the position where the move commences (at the arch), and perhaps associated as well with the recent play history for Player 1, that indicates that player 1 essentially invariably moves her Avatar from this position through the arch to a second position in two seconds, at a near constant rate.

Having this information Server 122 can predict from the data at the very start of Player 1's move, that the move in the conditioned response is very highly probable, and amend the data sending to Device 2 (and potentially other devices as well) to provide this move in two seconds, less the latency, so Player 1's avatar will display in Player 2's display 2 in very near real time as it will in Player 1's display. If the probability of the move is quite high, there will be very few instances where Player 1 may act differently, and smoothed correcting techniques will still be in play to correct errors that still occur. But the predictive ability will surly create a more accurate and coordinated game experience for Players 1 and 2, and any other players in the game.

Now, assuming that Player 1 is a new player, and is playing a game for the first time, but Player 2 is an experienced player, the AI-developed profile for Player 1 will be nearly empty, while the profile for Player 2 may be very fully developed. In this situation Server 122, serving and managing the game, will recognize that Player 1 has no usable AI profile. In this circumstance the system may refer to a condition/response matrix in place for players of a demographic group. For example, as well as tracking and building a profile for each player over different games and different playing sessions, the system may also determine demographic groups, such as all male players between ages 9 and 11 inclusive, living in an urban environment, preferring war games, and playing on average more than ten times per week, and for at least one hour each time. The system may continually prepare, test and update condition/response data for such groups, and update same regularly, and revert to such data for predictive data when a player is new, but fits, by static info, into a specific demographic. There may in addition be pre-programmed rules for using one or another path for certain players, based in part upon status of static info and dynamic profile. In the embodiment of the AI system just described, predictive data is determined for individual players. In another embodiment of the invention players may be categorized by experience, or by demographics in various ways. As an example, through tracking and comparison it may be found that players of one gender in a certain age group, and living in a certain region or country, may have very close propensity to make the same move under the same or similar circumstances. This categorical parallelism may then be used to predict movement display data for players in that group. Other criteria that may be considered throughout, in addition to geography, geometry and proximity to objects, may be presence and proximity of adversarial avatars in considering a move, and prediction.

Failing fit into a demographic, the system may simply treat input from Player 1 according to prior art processes, while making predictions and future responses for Player 2, having a well-developed AI profile. The determination of Player 1 being a new player may be made in a variety of ways. For example, because Player 1 is registered, or would not be in a game otherwise, there will be a profile set up for Player 1, but if that profile does not meet a minimum threshold for data content, then the new player determination will be automatic.

At the same time that the system determines that Player 1 is a new player another part of the AI system is tracking Player 1's behavior, and building (evolving) the player profile for Player 1. This process works by tracking Player 1 behavior related to Avatar position in game topology, and avatar proximity to other objects and landscape artifacts, and in some cases a variety of other characteristics and actions regarding Player 1 that may be acquired. This portion o the AI system works at all times regarding each player engaged in a game, so every player's profile is continuously evolving. There may be circumstances wherein tracking and profile amendment for one or more players may be suspended, either automatically or manually by an administrator, but generally speaking, if a game is running and is populated with players, the player's profiles are being amended.

In some embodiments of the invention, the AI system tracking is at least partly based on pre-analysis and testing of individual games. The inventor is aware, for example, that players may have considerable different strategies in playing a specific game, and may individually make considerably different decisions. But there will be patterns involved, and games can be tested, for example, to find such as pause clusters. Over many game play instances the AI system may track exactly where, and in proximity to what objects, avatars are seen to pause, before being induced by their associated players to move to another position, which may well be in another pause cluster. These positions may be tagged by the system as conditions to determine Player behavior in specific instances.

The AI system, having the chronology of behavior of many players, may track Player 1 individually by recording many instances of what Player 1 does each time Player 1's avatar starts to move from a specific position. This begins to build the condition/response matrix for Player 1. Over a considerable number of play sessions wherein Player 1 engages in a particular game, Player 1's profile may become quite rich in predictive subject matter, and the predictive part of the AI system can pick up clues from initial input in most instances of play by Player 1, and send mostly reliable display data for Player 1's avatar to other displaying devices before Player 1 completes the moves that are predicted. The corrections needed under this circumstance are far fewer than needed without the AI system and predictive ability.

Data indicating the commencing of a movement, including object state in the game at the time, and initial rate of movement, is just one input that may be used to trigger predictive data. The system also notes development of a move. In a circumstance of predicting and conditioning display data for Avatar 1 based on a move commencing at a particular position in a particular direction, for example, the conditioned display data may predict movement over a specific period to a new position, determined by the direction and rate, but the system may also note other objects and topology in the direction of the movement predicted, and consult the player's dynamic profile for what usually happens when Avatar 1 reaches or is in proximity to an object in the line of movement. There are many subtleties that may be considered in the AI driven predictive display transmission of the invention.

Figure 5:
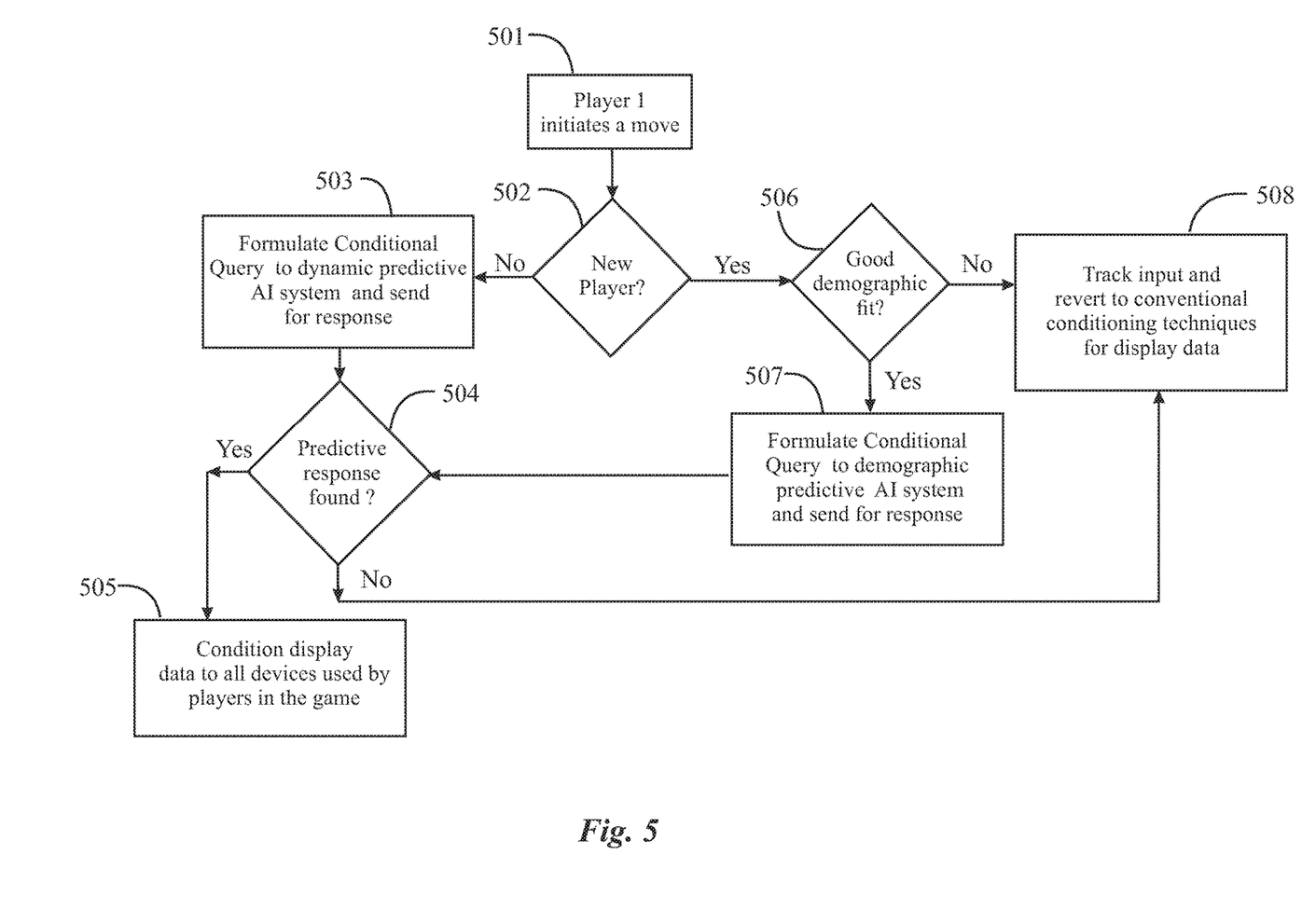
FIG. 5 is a flow chart illustrating steps in a process according to an embodiment of the invention.

FIG. 5 is a flow diagram illustrating action and decision flow from the viewpoint of the AI system of the invention, forming and transmitting predictive data for displaying Player 1's controlled objects in other displays.

At step 501 in FIG. 5 player 1 initiates a move of his avatar. In another interpretation it may be said that the system notes new input from Player 1. At step 502 the system determines if player 1 is a new player. If not, at step 503 a conditional query is formed to the dynamic AI system. If, at step 504 a predictive response is found, at step 505 the system will use that conditioned data in providing display data to device 2, and to other devices used by players in the game. If at 504 there is no predictive response data found control goes to step 508, and the system reverts to conventional techniques in providing display data.

If at step 502 it is determined that Player 1, for which the system is tracking new activity, is a new player by whatever criteria currently in use, at step 506 the system determines if Player 1 may be handled as a member of a demographic category. If Yes, at step 507 the system formulates a query to the demographic predictive data. If a predictive response is found, that data is used to condition display data sent to other devices at step 505. If not, the system again reverts to the conventional techniques at step 508.

In summary then, the system keeps track of all input from Player 1, determines state at each step, and looks for predictive data conditioning data from the dynamic profile for the player if the player is not a new player and has a substantial dynamic profile. If the player is new, but a good fit for a demographic group with a well-developed dynamic predictive profile, the system tries to find conditioning data from the demographic profile. And if no data is found in the demographic profile the system reverts to conventional techniques.

Figure 6:
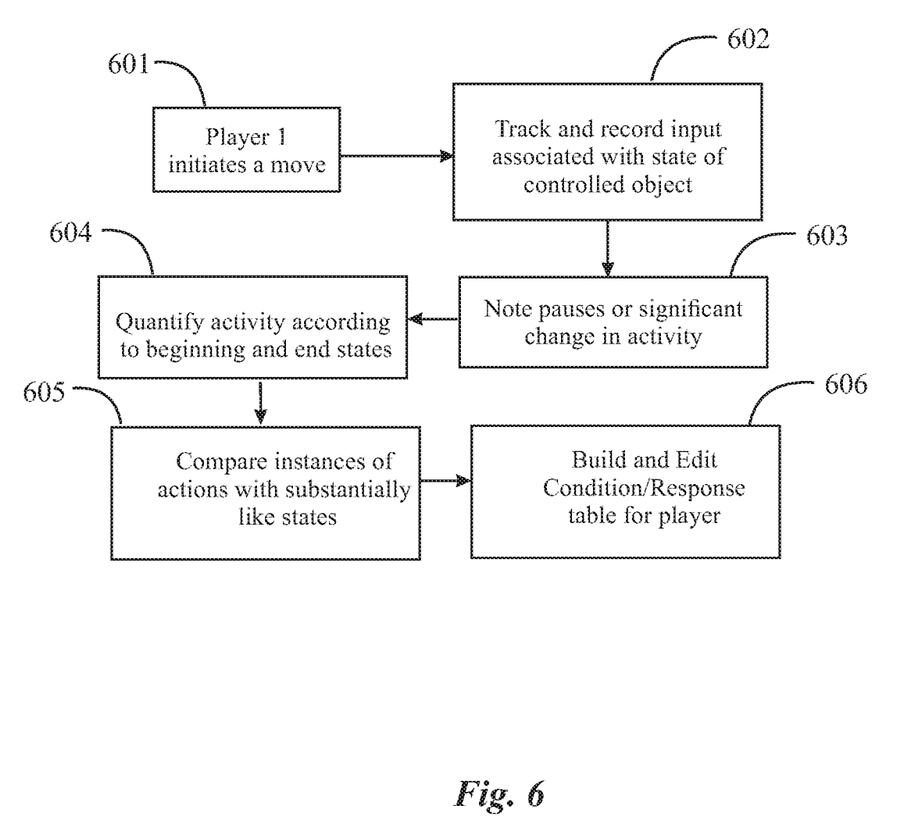
FIG. 6 is a flow diagram depicting a process for building dynamic profiles in embodiments of the invention for a particular player.

FIG. 6 is a flow diagram depicting a process for building dynamic profiles in embodiments of the invention for a particular player. At step 601 Player 1 moves his avatar or other controllable object. At step tracks and records the activity associated with state of the object in the environment. State may include position of the object geographically in the game topography, proximity to other objects, including avatars and inanimate objects, such as buildings and other infrastructure, 602 other conditions, such as whether the avatar is holding a weapon or a tool, direction the avatar may be facing, and much more. At step 603 the system notes pauses or significant changes in activity, which may have to do with changes in speed or direction, or both, a pause, and the like.

At step 604 the system quantifies the information gathered according to beginning and end states. For example, the system may have recorded over a period of time a move from a stopped state at a rapid rate to another stopped state and a different location in the topography of the environment. The system may quantify this as a typical movement of the avatar at a particular point in game play taken from an initial position. The system is looking for repeat moves that may be used, if seen to be common, as highly probable activities that the same player may make in future.

In the above description the prediction logic is executed on the network server side, but in some embodiments the logic might be accomplished, at least in part one or more devices used by players in a game. Each device 106 used by a player of necessity executes software, indicated as SW 1128 in FIGS. 1, 2 and 3. In some cases query response tables maintained for individual players might be communicated to player's devices and stored in local memory.

It was described above that the AI predictive system is based upon tracking player behavior, and making predictions based on ongoing developing circumstances based on that behavior. In one embodiment of the invention a portion of SW 128 at a player's device might be dedicated to tracking the gaming behavior of the player associated with the device at the local level. The resulting data might be uploaded to the network server(s) on a periodic basis, and used to modify and update predictive data for that player periodically.

In some cases, a player may be regularly engaged with one or more other specific players in a multi-player game. If there are such recurring instances of a specific "other" player appearing in a game by a first player, AI predictive patterns and data for that frequent player may be transmitted to the first player's device, where it may be used directly in plotting the other player's movement and actions, to be corrected, if need be, upon later receipt of actual display data from the server side regarding the other player's movements.

The skilled person will be aware that there may be a variety of different ways that logic may be accomplished in embodiments of the invention, without departing from the scope of the invention. Therefore, the scope of the invention is defined by the metes and bounds of the claims that follow.

The invention claimed is:

1. A system, comprising:
   a network-connected, computerized server executing software from a non-transitory medium, coupled to a data repository, serving a multi-player virtual-reality (VR) video game based on a virtual world, the VR video game stored in the data repository;
   a first computerized appliance having a first display, connected to the network, used by a first player to manipulate a first controllable object in the multi-player VR game;
   a second computerized appliance having a second display, connected to the network, used by a second player to manipulate a second controllable object in the multi-player VR game; and
   first predictive display data associated uniquely with the first player, the first controllable object controlled by the first player, and states of the object, states including at least location in the virtual world and proximity to other objects in the virtual world, the first predictive display data stored in the data repository;
   wherein the network-connected computerized server, executing the software, receives first data from the first computerized appliance indicating new activity of the first controllable object controlled by the first player, determines instant state of the controlled object, accesses the first predictive display data, selects, according to the instant state of the controlled object, specific predictive display data associated with the first player, and sends the specific predictive display data to the second computerized appliance, where it is utilized to display a predicted movement over time of the first controlled object in the second display.

2. The system of claim 1 wherein the predictive display data provides display of movement over time of the controlled object, from the instant state of the object at the time the movement commenced, to a new state predicted for an end of the movement.

3. The system of claim 1 further comprising a multiplicity of players and a multiplicity of VR games, wherein each player is accorded a profile, and each player is tracked regarding activity and state of controlled objects, the system building predictive display data in profiles for each player in the multiplicity of players.

4. The system of claim 3 wherein the activity and states of controlled objects associated with specific players is analyzed to categorize common and repetitive activity.

5. The system of claim 4 wherein the tracking, recording, analysis and predictive data creation is accomplished in a continuing basis as an artificial intelligence (AI) operation for determining and updating predictive data for display of controlled objects.

6. The system of claim 1 wherein predictive display data is stored and utilized at individual ones of computerized appliances used by players to connect to the network-connected server to play games.

7. The system of claim 1 wherein predictive display data is stored for demographically-related groups of players, and is accessed and used for predictive display for activities by new players for which the system has no significant history.

8. The system of claim 7 wherein, for activity of a controlled object by a player, the system first seeks predictive display data associated specifically with the player, failing to find such data, seeks data stored for a demographic category fitting the player, and failing to find such data, reverts to conventional techniques for sending display data.

9. A method, comprising:
   generating, by a network-connected, computerized server executing software from a non-transitory medium, coupled to a data repository, serving a multi-player virtual-reality (VR) video game based on a virtual world, the VR video game stored in the data repository, first predictive display data associated uniquely with the first player, the first controllable object controlled by the first player, and states of the object, states including at least location in the virtual world and proximity to other objects in the virtual world, the first predictive display data stored in the data repository;
   receiving, from a first computerized appliance having a first display, connected to the network, used by the first player to manipulate a first controllable object in the multi-player VR game, first data from the first computerized appliance indicating new activity of the first controllable object controlled by the first player;
   determining instant state of the controlled object;
   accessing the first predictive display data, and selecting, according to the instant state of the controlled object, the specific predictive display data associated uniquely with the first player; and
   sending the specific predictive display data to the second computerized appliance, where it is utilized to display a predicted movement over time of the first controlled object in the second display.

10. The method of claim 9 wherein the predictive display data provides display of movement over time of the controlled object, from the instant state of the object at the time the movement commenced, to a new state predicted for an end of the movement.

11. The method of claim 1 further comprising a multiplicity of players and a multiplicity of VR games, wherein each player is accorded a profile, and each player is tracked regarding activity and state of controlled objects, the system building predictive display data in profiles for each player in the multiplicity of players.

12. The method of claim 11 wherein the activity and states of controlled objects associated with specific players is analyzed to categorize common and repetitive activity.

13. The method of claim 12 wherein the tracking, recording, analysis and predictive data creation is accomplished in a continuing basis as an artificial intelligence (AI) operation for determining and updating predictive data for display of controlled objects.

14. The method of claim 9 wherein predictive display data is stored and utilized at individual ones of computerized appliances used by players to connect to the network-connected server to play games.

15. The method of claim 9 wherein predictive display data is stored for demographically-related groups of players, and is accessed and used for predictive display for activities by new players for which the system has no significant history.

16. The method of claim 15 wherein, for activity of a controlled object by a player, the system first seeks predictive display data associated specifically with the player, failing to find such data, seeks data stored for a demographic category fitting the player, and failing to find such data, reverts to conventional techniques for sending display data.

* * * * *